United States Patent
Beunet et al.

(12)

(10) Patent No.: US 6,517,943 B1
(45) Date of Patent: Feb. 11, 2003

(54) DECORATED GLASS-CERAMIC PLATE

(75) Inventors: Lionel Beunet, Fontainebleau (FR); Marie J. M. Comte, Fontenay aux Roses (FR); Eric Papin, Perthes en Gatinais (FR); Sophie Peschiera, Champagne sur Seine (FR)

(73) Assignee: Eurokera, Chateau-Thierry (FR)

( * ) Notice: Subject to any disclaimer, the term of this patent is extended or adjusted under 35 U.S.C. 154(b) by 0 days.

(21) Appl. No.: 09/762,353

(22) PCT Filed: Aug. 13, 1999

(86) PCT No.: PCT/IB99/01485
§ 371 (c)(1),
(2), (4) Date: Feb. 5, 2001

(87) PCT Pub. No.: WO00/09458
PCT Pub. Date: Feb. 24, 2000

(30) Foreign Application Priority Data

Aug. 13, 1998 (FR) ............................................. 98 10385

(51) Int. Cl.⁷ ............................. B32B 17/06; B05D 3/02
(52) U.S. Cl. ........................ 428/428; 428/427; 428/688; 427/374.1
(58) Field of Search .................... 501/14, 17; 427/374.1

(56) References Cited

U.S. PATENT DOCUMENTS

| | | | |
|---|---|---|---|
| 4,835,121 A | * 5/1989 | Shibuya et al. ................. 501/4 |
| 5,070,045 A | 12/1991 | Comte et al. ................... 501/4 |
| 5,326,728 A | 7/1994 | Boury et al. ................... 501/17 |
| 5,549,100 A | * 8/1996 | Heisner et al. ......... 126/214 A |
| 5,776,613 A | * 7/1998 | Shimatani et al. ............ 428/427 |

FOREIGN PATENT DOCUMENTS

| | | |
|---|---|---|
| EP | 771 768 | 5/1997 |
| FR | 2531700 | 2/1984 |
| FR | 2701473 | 8/1994 |

OTHER PUBLICATIONS

Modern Glass Practice, Samuel R. Scholes, Ph.D., CBI Publishing Company, Inc., Seventh Revised Edition, p. 217–220.*

XP–002101648, Nov. 1982, Japanese Abstract.

* cited by examiner

Primary Examiner—Deborah Jones
Assistant Examiner—G. A. Blackwell-Rudasill
(74) Attorney, Agent, or Firm—Milton M. Peterson

(57) ABSTRACT

The invention relates to a decorated glass-ceramic plate, suitable in particular as a cooktop, comprising a glass-ceramic plate having a low coefficient of thermal expansion between $\pm 15 \times 10^{-7}$ $K^{-1}$ (20–700° C.) and a decoration on the surface of said plate. Characteristically, said decoration comprises a vitrified glass frit containing 10 to 35% by weight of pigments and said decorated glass-ceramic cooktop has a modulus of rupture of at least 120 MPa. The invention also relates to a method of decorating glass-ceramic plates and to an enamel which is useful in particular for implementing said method.

16 Claims, No Drawings

DECORATED GLASS-CERAMIC PLATE

FIELD OF THE INVENTION

A cooking unit comprising a glass-ceramic sheet adapted to use as a cooktop and having a coating to provide a decorative effect.

BACKGROUND OF THE INVENTION

The present invention relates to a decorated glass-ceramic plate as well as to a method of obtaining such a plate, i.e. a method of decorating a glass-ceramic plate. Such plates are especially used as cooktops.

Another object of the present invention is an enamel, useful in particular in the implementation of said decoration method.

The cooking surface defined by a glass-ceramic plate, when it is used as a cooktop, must withstand not only the elevated temperatures employed for cooking without softening or distorting, but also it must withstand large differences in temperature which result from the fact that only one or more parts of the plate are heated. This has led to the use, in this field, of glass-ceramic plates having a coefficient of thermal expansion of zero or near-zero, i.e. generally equal to $0\pm3\times10^{-7}$ $K^{-1}$, and preferably zero.

Glass-ceramics having these characteristics are well known and are widely described in the literature. U.S. Pat. No. 5,070,045 (Comte et al.) describes such glass-ceramics the predominant crystal phase of which is a beta-quartz crystal phase. According to the present invention, decorative materials have been developed which are intended to be used especially, but not exclusively, with such glass-ceramics. It is as such that they can also be used with other low expansion glass-ceramics such as those described in the French patent application No. 97 09912.

Glass-ceramic plates have proved to be extremely satisfactory from the functional point of view as cooktops, but for aesthetic reasons, it was found that it was desirable to decorate the upper surface of said plates.

Enamelling is the decoration method which has proved to be the easiest to implement and which, consequently, is the most generally used. The main points of this technique, which are familiar to the person skilled in the art, have been summarised in the introductory part of the French patent application FR-A-2 701 473.

The initial problem which arises is that of the compatibility of the decorations with the glass-ceramics. In fact, there generally exists a difference in the thermal expansion between the glass-ceramic and the decoration. This difference in expansion of course lowers the mechanical strength of said plate comprising said decoration.

Glass-ceramics have a more than satisfactory inherent mechanical strength, the modulus of rupture (MOR) of the materials actually used being about 180 MPa. However, while the mechanical strength of the actual decorated plates is still adequate, it is significantly reduced and it has revealed to be desirable to obtain higher values, particularly it has revealed to be desirable to obtain decorated glass-ceramic plates having a modulus of rupture (MOR) of at least 120 MPa, preferably of at least about 130 MPa.

Apart from the aesthetic aspect and the problem of the mechanical strength of the decorated plate, a cooktop must also resist staining due to food, it must be easy to clean and must have a smooth surface in order to prevent marks due to contact with metal utensils. These requirements severely limit the potential decoration materials.

For example, a logical candidate was a glass frit that crystallises to produce a low expansion crystal phase, especially a beta-quartz crystal phase. The coatings constituted by these crystallised frits have a very satisfactory modulus of rupture (MOR) but their surface properties are mediocre since the crystals give rise to a surface roughness which is unacceptable, as regards marks left by metallic utensils, and possibilities of easy cleaning.

The U.S. Pat. No. 5,326,728 (Boury et al.), which corresponds to the French patent application FR-A- 2 701 473, describes enamels used in the production of decorative materials. Although these materials have proved to be satisfactory, efforts have been made to produce further improved decorative materials. In particular, these efforts have been directed at obtaining a coefficient of thermal expansion of the decoration which is more compatible with that of the plate this being in order to obtain a greater mechanical strength of the decorated article, and this is indicated by a higher modulus of rupture (MOR).

Thus, an object of the present invention is to provide a glass-ceramic plate which comprises an improved decoration and which has a modulus of rupture (MOR) of greater than 120 MPa whilst at the same time meets the various other requirements of such an article used as a cooktop (requirements recalled above), which has a great flexibility in decoration, which has an improved decoration comprising a mixture of a glass frit with pigments capable of providing a desired decorative effect; as well as to provide a decorative material (an enamel) which can be fired to produce an adherent decoration, especially during the firing of a glass plate to convert the glass into a glass-ceramic; as well as to provide a method of decorating such a glass-ceramic plate.

SUMMARY OF THE INVENTION

The present invention does in fact relate to a decorated glass-ceramic plate comprising a glass-ceramic plate having a low coefficient of thermal expansion between $\pm15\times10^{-7}$ $K^{-1}$ (20–700° C.), preferably near-zero (i.e. equal to $0\pm3\times10^{-7}$ $K^{-1}$ (20–700° C.)), and a decoration on the surface of said plate, said decoration comprising a vitrified glass frit containing 10 to 35% by weight of pigments (for 90 to 65% by weight of frit), and said decorated glass-ceramic plate having a modulus of rupture (MOR) of at least 120 MPa.

Preferably, the decorated glass-ceramic plate is constituted by a glass-ceramic the predominant crystal phase of which is a solid solution of beta-quartz and which advantageously has a coefficient of thermal expansion of $0\pm3\times10^{-7}$ $K^{-1}$ (20–700° C.).

The present invention also relates to a method of decorating a glass-ceramic plate, especially for generating a decorated cooktop for a cooking appliance, said glass-ceramic plate having a low coefficient of thermal expansion (see above), preferably near-zero (see above), said method comprising:

producing a mixture of 65 to 90% by weight of a glass frit and of 10 to 35% by weight of pigments; said glass frit having a coefficient of thermal expansion of $30–40\times10^{-7}$ $K^{-1}$ (0–300° C.) (preferably of $30–35\times10^{-7}$ $K^{-1}$ (10–300° C.)) and a softening point of at least 750° C. (preferably of at least 775° C.);

applying said glass frit/pigments mixture onto the surface of a glass-ceramic plate or onto the surface of a glass-ceramic precursor glass plate;

firing said plate coated with said glass frit/pigments mixture, to optionally transform said glass plate into a glass-ceramic plate, to vitrify the glass frit in the frit/pigments mixture, to obtain an adherence of the generated decoration with the glass-ceramic; and cooling said fired plate in order to obtain a decorated glass-ceramic plate having a modulus of rupture of at least 120 MPa.

DESCRIPTION OF THE INVENTION

The present invention is derived from research carried out to produce an improved decorative material for a glass-ceramic plate. In particular, a material was sought which was suitable for glass-ceramic plates the predominant crystal phase of which is a beta-quartz crystal phase and which has a coefficient of thermal expansion of near to zero, preferably of $0\pm3\times10^{-7}$ K$^{-1}$ (20–700° C.). The decorative material according to the invention meets this requirement but is not limited to such an application and can be used effectively on other glass-ceramics having a low coefficient of thermal expansion, i.e. situated in the range of $0\pm15\times10^{-7}$ K$^{-1}$ (20–700° C.).

The decorative materials used according to the prior art generally comprise pigments dispersed in a glass frit. Said pigments confer to said material its colour and its opacity whereas the glass ensures their mutual binding and their adherence with the glass-ceramic. A glass which is suitable as a frit was described by the Applicant in the U.S. Pat. No. 5,326,728 and consists of a boroaluminosilicate glass which has a coefficient of thermal expansion of about $55\times10^{-7}$ K$^{-1}$ (0–300° C.) and a softening point of about 675° C. (see Composition A of Table II below).

In the course of the research to produce a decorated glass-ceramic having a higher mechanical strength, two factors became apparent which were particularly important for increasing the mechanical strength of a decorated glass-ceramic plate. The first related to the lowering of the coefficient of thermal expansion of the glass frit, and this can be accomplished by means of a frit that can crystallise. However, as indicated above, this approach revealed to be unfruitful due to the fact that the rough surface produced by the crystals is sensitive to marks made by metal utensils and is difficult to clean, and this constitutes an important drawback in the field of the preparation of food. This lack of success led to further studies on glass frits which do not crystallise. The other important factor which was discovered, in a non-obvious way, is that it is important to limit the ionic diffusion which takes place across the interface between the decoration and the glass-ceramic substrate.

The phenomenon of alkali metal ion migration is well known and it was noted that it was not possible to eliminate the presence of the alkali metal ions from the frit without creating other problems despite the presence of said ions being limited. It then appeared important to employ a frit of glass of high viscosity; this being evidenced by a high softening point. In fact, this apparently inhibits the tendency of the alkali metal ions to migrate during heat treatments.

The decorative material according to the present invention essentially consists of 10 to 35% by weight of pigments dispersed in 65 to 90% by weight of glass frit. At least 10% by weight of pigments is necessary to obtain a suitable effect and it is possible to incorporate up to about 35% by weight of pigments. Generally, in order to obtain the decorative effect anticipated, it is not necessary to include more than about 20% by weight of such pigments.

It is possible to use any commercial pigment individually or in combination. The particular pigment or pigments which are employed depend upon the opacity and particular colour desired, or upon another decorative effect desired.

Table I below shows two examples of individual pigments and an example of a combination that can be used. In each case, the pigments are mixed in an amount of 15% by weight with 85% by weight of a glass frit defined below. Table I identifies the pigments by their source, their main constitutive elements and the colour of the coating after firing.

TABLE I

| MIXTURE | PIGMENTS | MAIN ELEMENTS | COLOUR |
|---|---|---|---|
| 1 | — | TiO$_2$ | White |
| 2 | FA 9150 (Bayer) | Ti, Sb, V | Brown |
| 3 | X928 (CERDEC) | Co, Al | Black |
|  | B768 (CERDEC) | Cr, Co, Ni, Fe, |  |
|  | EV 1092 (CERDEC) | Co, Cr |  |

The glass frit employed for the decoration according to the invention advantageously has a coefficient of thermal expansion of $30–40\times10^{-7}$ K$^{-1}$ (0–300° C.), preferably of at most $35\times10^{-7}$ K$^{-1}$, and a softening point of at least 750° C., preferably of at least 775° C. At the softening point, the viscosity of a glass is $10^{6.5}$ Pa·s ($10^{7.5}$ poises).

Said included glass is generally a soda potash borosilicate. In fact, it was observed that such glasses possess the characteristics set forth above.

The composition of said included glass, calculated in weight % of oxides, advantageously consists, essentially, of 70–82% SiO$_2$, 12–18% B$_2$O$_3$, 1–3% Al$_2$O$_3$, at most 5% Na$_2$O+K$_2$O and at most 1.2% of at least one fining agent. According to a particularly preferred variant, the composition essentially consists of 76–81% SiO$_2$, 14–15.5% B$_2$O$_3$, 2–2.7% Al$_2$O$_3$, 2.3–3.2% Na$_2$O, 1–1.5% K$_2$O, 0–1% As$_2$O$_3$+Sb$_2$O$_3$ (+meaning << and/or >>).

Table II below shows a comparison of the composition of a glass frit from the U.S. Pat. No. 5,326,728 cited above (A) with a composition of a preferred glass frit according to the present invention (B). The compositions are indicated in weight % of the glass batch.

TABLE II

|  | A | B |
|---|---|---|
| SiO$_2$ | 41.8 | 78.3 |
| B$_2$O$_3$ | 27.4 | 14.75 |
| Al$_2$O$_3$ | 18.7 | 2.25 |
| Li$_2$O | 2.6 | — |
| Na$_2$O | 0.8 | 2.6 |
| K$_2$O | 3.4 | 1.25 |
| CaO | 2.8 | — |
| ZrO$_2$ | 2.5 | — |
| As$_2$O$_3$ | — | 0.85 |
| Softening point (° C.) | 676 | 780 |
| Coefficient of thermal expansion (K$^{-1}$ (0–300)) | $55\times10^{-7}$ | $34\times10^{-7}$ |

A glass frit is prepared by mixing a batch of suitable starting materials and melting it at about 1650° C. for about six hours. The molten glass is poured into water wherein it fractures into particles which are dried and ground to a powder having an average particle size of less than about 6 μm.

The pigments are then added which are mixed with the powdered glass frit. The nature of the pigments, and their amounts, depend upon the desired colour and opacity for a particular application. The coating mixture contains at least 10% by weight of pigments, and may contain up to 35% (see above). The balance is constituted by the glass frit. A mixture of 15% pigments and 85% glass frit has proved satisfactory for most of the applications. This mixture should be homogeneous, but no special mixing procedure is required.

The application of a slip or paste by screen printing, which gives a thin uniform coating, constitutes a suitable means of applying said mixture onto a glass-ceramic plate. For such an application, an organic vehicle is added, typically in an amount of 30–50% by weight of the total weight of the slip. The amount of vehicle depends upon the ultimate thickness desired. If a design is desired, the screen printing screen can be prepared in the form of a mask in a known manner.

According to the present invention, it is advantageous that the decorative material can be applied onto the surface of the glass plate which constitutes a precursor for the glass-ceramic plate. After drying, the material on the glass plate can be heat treated according to a ceramming cycle that converts the glass into a glass-ceramic. At the same time, the glass frit, present in the decorating material, softens and bonds to the pigments and onto the surface of the glass-ceramic.

As described in the U.S. Pat. No. 5,070,045, already cited, a suitable ceramming schedule is as follows:

a temperature increase at a rate of 50–80° C./min up to the nucleation range, generally located close to the transformation range of the glass, a temperature increase in the range of nucleation (670–800° C.) in about 15–25 min, a temperature increase up to the crystallisation temperature (900–960° C.) in about 15–30 min, maintaining the crystallisation temperature for 10–25 min, and rapid cooling to ambient temperature.

Other types of heat treatment or firing may be used in order to ensure the desired effects: ceramming the glass plate+vitrification of the pigment-loaded frit+adhesion of said loaded frit onto the cerammised glass plate. Thus, the decorative material can be applied onto the crude glass plates as described in the French patent application No. 97 09912 and the ceramming cycles, as described in said French patent application No. 97 09912, can be implemented in order to obtain decorated glass-ceramic plates of the invention based on the glass-ceramic plates according to the French patent application No. 97 09912. The maximum temperatures attained during said ceramming cycles may attain values as high as 1070° C. In said French patent application No. 97 09912, ceramming cycles are also described which comprise several successive cycles. In such cases, it is preferred to apply the glass frit/pigments mixture (precursor of the desired decoration) before the last of said successive cycles such that said mixture undergoes one sole heat treatment only.

Hence, it is understood that the expression << glass-ceramic precursor glass plate >>, as used in the present description and the annexed claims, incorporates both the crude glass plate as well as the glass plate undergoing ceramming.

For some applications, it may be desirable, or even necessary, to apply the material onto the already cerammised glass-ceramic plate. In this case, the coating can be applied in the same manner as in the case of a precursor glass plate, but directly onto the glass-ceramic plate. This double firing procedure (1° ceramming; 2° treatment of the glass frit/pigments mixture) may be desirable for adjusting each firing cycle. In this case, the material situated on the glass-ceramic may be fired for about 15 minutes at a temperature in the range of 920–960° C.

Another object of the present invention is the enamel used for the implementation of the decorating method described above, used for obtaining the decorated glass-ceramic plates of the invention. Said enamel is novel per se, and constitutes another object of the present invention. Characteristically, the enamel comprises 10 to 35% by weight of pigments in 65 to 90% by weight of a specific glass frit. Said glass frit has a coefficient of thermal expansion of $30-40 \times 10^{-7}$ $K^{-1}$ (0–300° C.), preferably of $30-35 \times 10^{-7}$ $K^{-1}$ (0–300° C.) and a softening point of at least 750° C., preferably of at least 775° C. Advantageously, the composition of said glass frit, calculated in weight % of oxides, essentially consists of 70–82% $SiO_2$, 12–18% $B_2O_3$, 1–3% $Al_2O_3$, at most 5% $Na_2O+K_2O$ and at most 1.2% of at least one fining agent. Particularly preferably, said composition essentially consists of 76–81% $SiO_2$, 14–15.5% $B_2O_3$, 2–2.7% $Al_2O_3$, 2.3–3.2% $Na_2O$, 1–1.5% $K_2O$ and 0–1% $As_2O_3+Sb_2O_3$.

The invention is illustrated by two Examples 1 and 2 below, which are to be considered in parallel with the Comparative Example 3.

Decorated glass-ceramic plates were prepared according to the invention with the glass frit B the composition and characteristics of which are given in Table II above; a prior art decorated glass-ceramic plate was prepared with the glass frit A the composition and characteristics of which are also given in Table II above.

The respective contents of frit and pigments in the mixtures prepared are indicated in Table III below (contents expressed in % by weight). The properties of the plates obtained, decorated with said mixtures, are also indicated.

The conditions under which said decorated plates are obtained, and the methods of evaluation of their properties, are then specified.

TABLE III

| Examples | 1 | 2 | 3 |
| --- | --- | --- | --- |
| Frit | B | B | A |
| % frit | 85 | 85 | 70 |
| % pigments | 15 | 15 | 30 |
| Plate properties | | | |
| Modulus of rupture (MOR in MPa) | 150 | >120 | 70 |
| Resist metal marks | yes | yes | yes |
| Easily cleanable | yes | yes | yes |

The plates of Examples 1 and 2 were therefore decorated with mixtures containing the glass frit B, while the plate of the Comparative Example 3 was decorated with a mixture containing the glass frit A.

Said mixtures were obtained with the same pigments (pigment mixture 3 of the Table I). The mixtures were constituted with a vehicle in order to be applicable on the plates by screen printing.

For Examples 1 and 3, the mixture was applied by screen printing onto the upper surface of a glass plate precursor for a glass-ceramic plate having a coefficient of thermal expansion of zero. The glass plate was then dried and heat treated according to the ceramming cycle for the glass which was a cycle of 1 hour with a maximum temperature of 925° C., which was maintained for 15 minutes. During this heating cycle, the glass plate was transformed into a glass-ceramic and the decorative mixture had become an adherent vitrified layer the thickness of which was about 3 $\mu$m.

For Example 2, the mixture was applied onto the upper surface of a glass plate precursor for a glass-ceramic plate which had a coefficient of thermal expansion equal to $10\times10^{-7}$ K$^{-1}$. The ceramming cycle was a cycle of 2 h, with a maximum temperature of 1070° C. which was maintained for 30 min. The decoration obtained had itself a thickness of 3 μm as well.

The modulus of rupture (MOR) was measured by means of a 3 points flexion setting, the decorated surface being in extension. According to the invention, a modulus of rupture of at least 120 MPa is specified and a value of at least 130 MPa is preferred.

The cleanability was evaluated in the following manner: a mixture of meat, egg, milk, flour, gruyere cheese, tapioca and tomato purée was placed between a saucepan full of water and the decorated zone of the cooktop. The whole was then heated for 10 minutes such that the mixture burns and sticks to the cooktop. The cleanability and the aspect of the decoration after cleaning are then evaluated.

The formation of marks by metals was evaluated by marking the decorated surface with a metallic piece. The result is satisfactory if only light marks are observed, and it is possible to remove them with a commercial product sold for cleaning cooktops.

What is claimed is:

1. A glass-ceramic cooktop, for a cooking unit, comprising a glass-ceramic sheet having a low coefficient of thermal expansion and a decoration on the surface of the sheet, the decoration comprising a vitrified glass frit containing 10–35% by weight pigments, and the decorated glass-ceramic cooktop having an MOR of at least 120 MPa.

2. A glass-ceramic cooktop in accordance with claim 1 wherein the glass-ceramic sheet is a glass-ceramic in which the predominant crystal phase is a beta-quartz solid solution.

3. A glass-ceramic cooktop in accordance with claim 1 wherein the glass frit is a soda potash borosilicate.

4. A glass-ceramic cooktop in accordance with claim 3 wherein the glass frit has a coefficient of thermal expansion of 30–40×10$^{-7}$/° C. (0–300° C.) and a softening point greater than 750° C.

5. A glass-ceramic cooktop in accordance with claim 3 wherein the glass frit composition, as calculated in weight % on an oxide basis, consists essentially of 70–82% SiO$_2$, 12–18% B$_2$O$_3$, 1–3% Al$_2$O$_3$, both Na$_2$O and K$_2$O in a total amount of not more than about 5% and a fining agent.

6. A glass-ceramic cooktop in accordance with claim 5 wherein the glass frit composition consists essentially of about 78.3% SiO$_2$, 14.75% B$_2$O$_3$, 2.25% Al$_2$O$_3$, 2.6% Na$_2$O, 1.25% K$_2$O and 0.85% As$_2$O$_3$.

7. A glass-ceramic cooktop in accordance with claim 1 wherein the pigments are selected from a group consisting of colorants and opacifiers.

8. A glass-ceramic cooktop in accordance with claim 1 wherein the glass-ceramic sheet has a coefficient of thermal expansion in the range of 0±3×10$^{-7}$/° C.

9. A method of decorating a cooktop for a cooking unit wherein the cooktop comprises a glass-ceramic sheet having a low coefficient of thermal expansion, the method comprising producing a mixture of 65–90% glass frit and 10–35% coloring or opacifying pigments, the glass frit having a soda potash borosilicate composition, a coefficient of thermal expansion of 30–40×10$^{-7}$/° C. (0–300° C.) and a softening point of at least 750° C., applying the glass frit/pigment mixture to the surface of the glass-ceramic sheet, or to a precursor glass sheet for the glass-ceramic, firing the applied mixture to vitrify the glass frit in the frit/pigment mixture to provide an adherence to the glass-ceramic, and cooling to provide a decorated cooktop having an MOR of at least 120 MPa.

10. A method in accordance with claim 9 which comprises applying the glass frit/pigment mixture to the surface of a glass-ceramic sheet having a coefficient of thermal expansion in the range of 0±3×10$^{-7}$/° C.

11. A method in accordance with claim 10 which further comprises heat treating the glass frit/pigment mixture for about 15 minutes at a temperature in the range of 920–960° C.

12. A method in accordance with claim 9 which comprises applying the glass frit/pigment mixture to a precursor glass sheet for the glass-ceramic sheet.

13. A method in accordance with claim 12 which further comprises heat treating the precursor, glass sheet and the glass frit/pigment mixture applied thereto in accordance with the following schedule:

A temperature increase at a rate of 50–80° C./min up to the nucleation range, generally located close to the transformation range of the glass.

A temperature increase through the nucleation range (670–800° C.) in about 15–25 min.

A temperature increase up to the crystallization temperature (900–960° C.) in about 15–30 minutes.

A crystallization temperature hold for 10–25 min.

A rapid cooling to room temperature.

14. A method in accordance with claim 13 which comprises thermally treating the glass sheet at a crystallization temperature of about 925° C. for about 15 minutes.

15. A method in accordance with claim 9 which comprises applying a thin, uniform layer of the glass frit/pigment mixture over the surface of the glass precursor sheet or glass-ceramic sheet by silk screening.

16. A method in accordance with claim 9 which comprises producing a glass frit/pigment mixture in which the glass frit has a coefficient of thermal expansion of 30–40×10$^{-7}$/° C. (0–300° C.) and a softening point of at least 750° C.

* * * * *